United States Patent
Choi et al.

(10) Patent No.: US 6,585,798 B2
(45) Date of Patent: Jul. 1, 2003

(54) FLUIDIZED BED REACTOR FOR PREVENTING THE FINE IRON ORE FROM STICKING THEREIN AND METHOD THEREOF

(75) Inventors: Nag-Joon Choi, Pohang (KR); Sun-Kwang Jeong, Pohang (KR); Hang-Goo Kim, Pohang (KR); Heung-Won Kang, Pohang (KR); Hauzenberger Franz, Linz (AT)

(73) Assignees: Pohang Iron & Steel Co., Ltd., Kyungsangbuk-do (KR); Research Institute of Industrial Science & Technology, Kyungsangbuk-do (KR)

( * ) Notice: Subject to any disclaimer, the term of this patent is extended or adjusted under 35 U.S.C. 154(b) by 123 days.

(21) Appl. No.: 09/913,930
(22) PCT Filed: Dec. 20, 2000
(86) PCT No.: PCT/KR00/01495
§ 371 (c)(1), (2), (4) Date: Nov. 21, 2001
(87) PCT Pub. No.: WO01/46478
PCT Pub. Date: Jun. 28, 2001

(65) Prior Publication Data
US 2002/0166412 A1 Nov. 14, 2002

(30) Foreign Application Priority Data
Dec. 20, 1999 (KR) .............................. 99/59509

(51) Int. Cl.[7] .............................. C22B 5/14; C21B 13/14
(52) U.S. Cl. .............................. 75/446; 75/450; 266/157; 266/172
(58) Field of Search .................... 75/446, 450; 266/157, 266/172

(56) References Cited

U.S. PATENT DOCUMENTS 5,961,690 A  * 10/1999  Kepplinger et al. .......... 75/446

FOREIGN PATENT DOCUMENTS

WO          9621045          7/1996

* cited by examiner

Primary Examiner—Melvyn Andrews
(74) Attorney, Agent, or Firm—Baker Botts LLP

(57) ABSTRACT

A smelting reduction apparatus which separates exhaust gas, which is exhausted from a melter-gasifier or a fluidized bed reactor, into dusts and reducing gas to supply them to each fluidized bed reactor respectively is disclosed, in which the smelting reduction apparatus includes a three-stage type fluidized bed reactor, a melter-gasifier for manufacturing molten pig iron by finally reducing the fine iron ores of which reaction is finished in a final fluidized bed reactor, and a dust separating device, which performs separation of exhausted gas from the melter-gasifier into dusts and reducing gas, so as to supply the separated reducing gas to a lower part of the final fluidized bed reactor, dusts having a larger particle sizes in the separated dusts to the melter-gasifier again, and fine dusts having a smaller particle sizes in the separated dusts to an upper part of a gas distributor of the final fluidized bed reactor.

17 Claims, 1 Drawing Sheet

FLUIDIZED BED REACTOR FOR PREVENTING THE FINE IRON ORE FROM STICKING THEREIN AND METHOD THEREOF

BACKGROUND OF THE INVENTION a) Field of the Invention

The present invention relates to smelting reduction process and, more particularly, to a smelting reduction apparatus which separates exhaust gas, which is exhausted from a melter-gasifier or a fluidized bed reactor, into dusts and reducing gas to supply them to a corresponding fluidized bed reactor respectively.

(b) Description of the Related Art

Generally, a blast furnace has been extensively used to make iron through reducing and melting iron ores. However, the blast furnace involves a drawback that the charging materials should be pre-treated to bear is agglomerated forms such as sintered iron ores and cokes.

In order to solve such a problem, a smelting and reduction process has been developed for the direct use of fine iron ores and coal without pretreatment.

The smelting reduction process is composed of a preliminary reduction process and a final reduction process. In the preliminary reduction process, the charged fine iron ores are pre-heated and then preliminarily reduced. In the final reduction process, a sponge iron which is reduced in the preliminary reduction process is finally reduced and melted in the presence of high pressure oxygen and coal to thereby form a molten iron.

The fluidized bed reduction reactor (hereinafter, referred to "fluidized bed reactor") is used as an equipment for the preliminary reduction process, and a melter-gasifier is used as an equipment for the final reduction process.

The preliminary reduction process is typically divided into a moving bed type and a fluidized bed type according to a contact state between raw iron ores and reducing gas. It is efficient to apply the fluidized bed type preliminary reduction process rather than the moving bed type if the charged iron ore has a small particle size and a wide particle size distribution.

Korean Patent No. 117065 discloses an apparatus for such a fluidized bed type preliminary reduction process. According to this patent, a device for uniformly reducing a fine iron ore having a wide particle size distribution in a fluidized bed reactor is proposed. In order to achieve such a uniform reducing of the fine iron ore, the patent provides a three-stage type fluidized reactor which is designed in a conical shape having a wide upper part and a narrow lower part, wherein the iron ore is reduced through three stages of pre-heating, pre-reducing and final preliminary reducing. This patent also proposes a cyclone for collecting fine iron ore, which is discharged, from an upper part of the respective fluidized bed reactors by scattering to supply to a bottom part of the respective fluidized bed reactors.

According to this patent designed as above, the fine iron ore having the wide particle size distribution may be efficiently reduced while maintaining stable fluidized state.

This patent has, however, a disadvantage that a gas distributor of the fluidized bed reactors may be clogged by dusts dust contained in the reducing gas. That is, a large amount of dusts is included in exhaust gas, which is discharged from the melter-gasifier and supplied to the fluidized bed reactors. If the dusts are supplied to the gas distributor of a final reduction furnace, the dust becomes stuck to nozzles, which are mounted in the gas distributor, and if the sticking phenomenon is accumulated, the gas distributor itself becomes clogged.

If the gas distributor is clogged as above, it becomes impossible to maintain a uniform flow of the reducing gas in the fluidized bed reactors, and more severely, operations should be stopped.

SUMMARY OF THE INVENTION

Therefore, the present invention is derived to resolve the above disadvantages and problems of the related art and has an object to provide a smelting and reduction apparatus which can separate exhaust gas, which is exhausted from a melter-gasifier or a fluidized bed reactor, into dusts and reducing gas to supply them to each fluidized bed reactor respectively.

It is another object of the present invention to provide a method for manufacturing molten pig iron by a smelting and reduction process, which can prevent sticking of particles of fine iron ores and clogging of a gas distributor by coating separated dusts on a surface of the particles of the fine iron ores which is flowing in the fluidized bed reactors.

This and other objects may be achieved by the present invention, which is described in detail hereinafter.

According to one aspect of the present invention, a smelting and reduction apparatus includes a three-stage type fluidized reactor, a melter-gasifier for manufacturing molten pig iron by finally reducing fine iron ores of which reaction is finished in a final fluidized reactor, and a dust separating device, which performs separation of exhausted gas from the melter-gasifier into dusts and reducing gas so as to supply the separated reducing gas to a lower part of the final fluidized bed reactor, dusts having a larger particle sizes in the separated dusts to the melter-gasifier again, and fine dusts having a smaller particle sizes in the separated dusts to an upper part of a gas distributor of the final fluidized bed reactor.

The three-stage type fluidized bed reactor of the present invention includes a) an or e charging duct mounted on a side of respective fluidized bed reactors for charging fine iron ores, b) a gas supply duct mounted at a lower part of the respective fluidized bed reactors, c) an ore discharge duct mounted on a side wall of the respective fluidized bed reactors for discharging fine iron ores which are charged into the respective fluidized bed reactors and reactions thereof are finished, d) a gas distributor mounted in the respective fluidized bed reactors for uniformly dispersing reducing gas into the respective fluidized bed reactors, and e) a cyclone for separating fine iron ore particles from the reducing gas, which is discharged from the upper parts of the respective fluidized bed reactors, to supply the reducing gas to next reactor or discharge outside and recycle the fine iron ore particles to the lower parts of the respective fluidized bed reactors.

In the present invention, each fludized bed reactor is manufactured in a dual-stage cylindrical shape of which a diameter of a lower part is small and a diameter of an upper part is large so that lower and the upper parts are to connected to each other slantingly. In the dual-stage cylindrical fluidized bed reactors, the diameter of the upper cylindrical part is larger than that of the lower cylindrical part by 1.5~2.0 times, and the inclination of the connection between the upper and lower cylindrical parts is 20~30° with relation to a central axis of the fluidized bed reactors. A whole height of the fluidized bed reactors is larger than a diameter of the lower cylindrical part by 10~20 times.

In the present invention, the dust separation device is formed of at least two or more cyclones and at least one or more dust storage bins. A first cyclone of the cyclones is connected to the upper part and the lower part of the melter-gasifier and an upper part of a second cyclone. The second cyclone is connected to the lower part of the final fluidized bed reactor and an upper part of the dust storage bin and the dust storage bin is connected to an upper part of the gas distributor of the final fluidized bed reactor.

In the dust separation device, the second cyclone and the dust storage bin is connected by a dust supply duct which is mounted with a two-way valve, wherein the dust supply duct branched by the two-way valve is connected to a dust supply duct which connects the first cyclone and the melter-gasifier.

The dust storage bin part is formed of three dust storage bins respectively connected to one another via the dust supply ducts. The dust supply duct which is positioned at a lower part of a first dust storage bin is mounted with a nitrogen gas injection device, so that dusts stored in the first dust storage bin can be pneumatically transported to a second dust storage bin with high pressure nitrogen gas. A dust supply duct which is positioned at a lower part of a third dust storage bin is also mounted with a nitrogen gas injection device, so that the dusts stored in the third dust storage bin can be introduced into the final reactor with high pressure nitrogen gas.

On the other hand, a dust supply duct connecting the lower part of the third dust storage bin to the nitrogen gas injection device is mounted with a dust introducing feeder for controlling the amount of dust supply to the final reactor. Further, each of the dust supply ducts is mounted with a control valve for controlling a supply of the dusts conveyed to the dust supply ducts.

The molten pig iron is manufactured from the fine iron ores by using the smelting reduction apparatus hereinabove.

The process for manufacturing the molten pig iron by using the smelting reduction apparatus of the present invention is characterized in that the exhaust is gas discharged from the melter-gasifier is separated into reducing gas and dusts to be supplied to the final fluidized bed reactor.

Even though the separated reducing gas is directly supplied to the lower part of the final fluidized bed reactor, the dusts are separated again such that the fine dusts having a smaller particle size is blown into the upper part of the gas distributor of the final fluidized bed reactor by high pressure nitrogen.

As the fine dusts are blown into the fluidized bed reactor, the fine dusts are coated on surfaces of the fine iron ores, so that the sticking between the fine iron ores and the gas distributor may be prevented.

The pressure of the nitrogen for the injection of dust particles is controlled higher than an internal pressure of the final fluidizing bed reactor by 2~3 times.

A velocity of the reducing gas in the respective fluidizing bed reactors is preferably controlled 1.2~1.5 times of a minimum fluidizing velocity of the fine iron ores residing in the fluidizing bed reactors.

If the molten pig iron is manufactured by the process described hereinabove, the sticking between the fine iron ores and the gas distributor may be prevented, thereby effectively preventing operation obstacles of the smelting reduction process.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawing, in which like reference symbols indicate the same or the similar components, wherein.

DETAILED DESCRIPTION OF THE PREFERRED EMBODIMENTS

Figure 1:
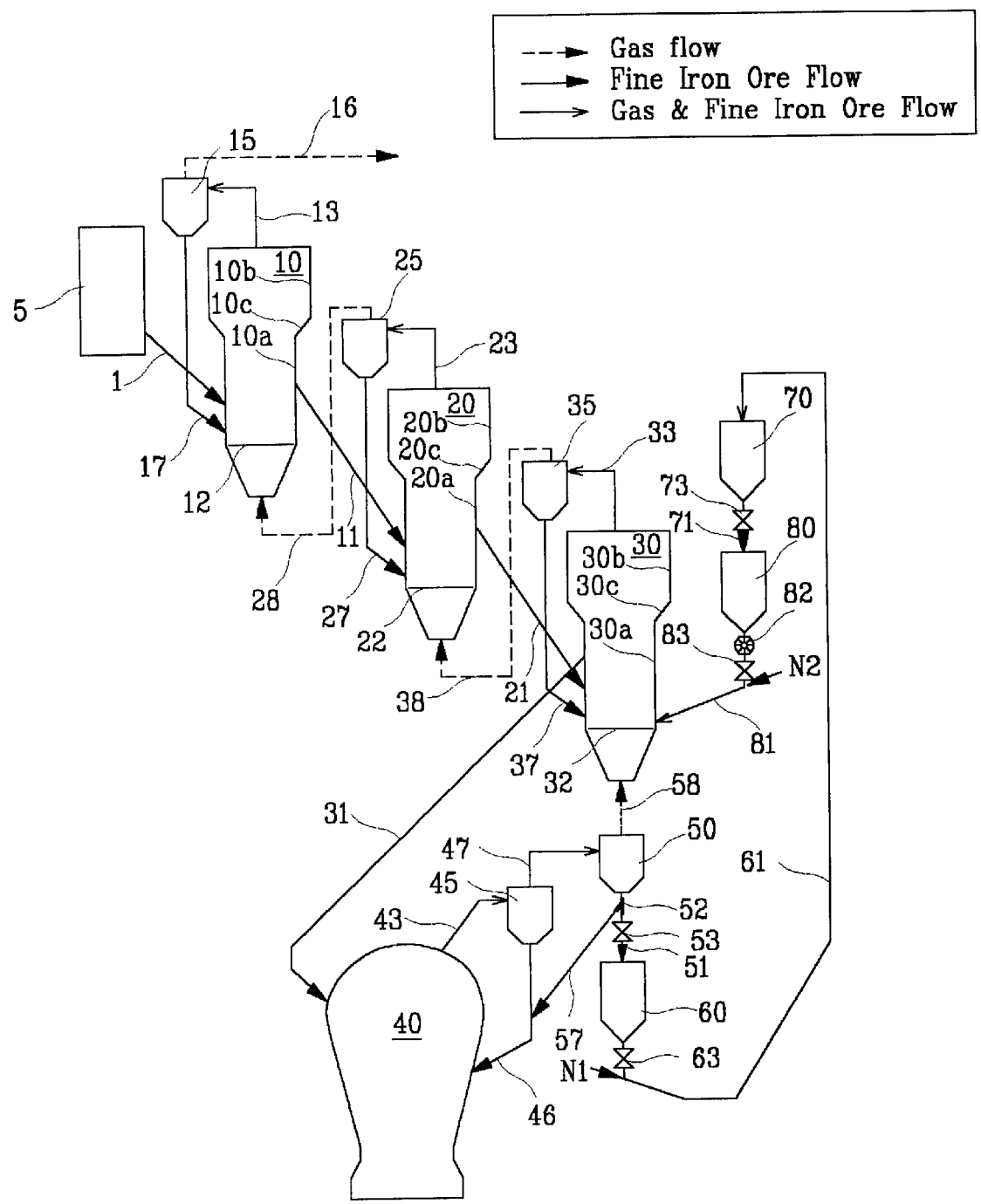
FIG. 1 is a structural view of a smelting reduction apparatus including a three-stage type fluidized bed reactor according to a preferred embodiment of the present invention.

Preferred embodiments of this invention will be explained with reference to the accompanying drawing.

FIG. 1 illustrates a structural view of a smelting reduction apparatus including three-stage type fluidized bed reactors.

As shown in FIG. 1, the smelting reduction apparatus includes a three-stage type fluidized bed reactor and a melter-gasifier 40.

The three-stage type fluidized bed reactors include a pre-heating furnace 10, a pre-reducing furnace 20, and a final reducing furnace 30.

The pre-heating furnace 10 is mounted with an ore charging duct 1 on a side wall for charging fine iron ores which fall down from a charging bin 5, a gas supply duct 28 at a lower part for supplying reducing gas which is discharged from the pre-reducing furnace 20, and a first cyclone 15 at an upper part. The first cyclone 15 collects fine particles of ores which are included in the exhaust gas discharged via a gas discharging duct 13 and re-supplies the fine ore particles to the lower part of the pre-heating furnace 10. The exhaust gas from which the fine ore particles are removed is released outside via a discharge duct 16, which is mounted at an upper part of the cyclone 15.

The pre-reducing furnace 20 is mounted with an ore discharging duct 11 on a side wall for supplying the fine iron ores which are preheated in the pre-heating furnace 10, a gas supply duct 38 at a lower part for supply reducing gas which is discharged from the final reducing furnace 30, and a second cyclone 25 at an upper part. The second cyclone 25 collects fine particles of ores which are included in the exhaust gas discharged via a gas discharging duct 23 and re-supplies the fine ore particles to a lower part of the pre-reducing furnace 20. The exhaust gas from which the fine ore particles are removed is supplied to the lower part of the pre-heating furnace 10 via a gas supply duct 28 which is mounted at an upper part of the cyclone 25.

The final reducing furnace 30 is mounted with an ore discharging duct 21 on a side wall for supplying the fine iron ores which are pre-reduced in the pre-reducing furnace 20, a gas supply duct 58 at a lower part for supply reducing gas which is discharged from the melter-gasifier 40, and a third cyclone 35 at an upper part. The third cyclone 35 collects fine particles of ores which are included in the exhaust gas discharged via a gas discharging duct 33 and re-supplies the fine ore particles to a lower part of the final reducing furnace 30. The exhaust gas from which the fine ore particles are removed is supplied to the lower part of the pre-reducing furnace 20 via a gas supply duct 38 which is mounted at an upper part of the cyclone 35.

As for the shape of the respective fluidized bed reactors as described above, the pre-heating furnace 10, the pre-reducing reactor 20 and the final reducing reactor 30 has a small diameter in the lower parts 10a, 20a, and 30a, a large diameter in the upper parts 10b, 20b, and 30b, and the slantingly formed cylindrical connection parts 10c, 20c, and 30c. Therefore, the whole shape of the respective fluidized bed reactors is formed in the dual-stage cylinder having the narrow lower parts and the wide upper parts.

The diameter of the upper parts 10b, 20b and 30b of the respective fluidized bed reactors is formed in the range of 1.5~2.0 times of the diameter of the lower parts 10a, 20a and 30a, such that the velocity of the gas in the upper parts of the respective fluidized bed reactors is decreased for preventing the fine iron ores from being discharged as they are.

The whole height of the respective fluidized bed reactors is preferably formed 10~20 times of the diameter of the lower parts 10a, 20a and 30a. If the respective fluidized bed reactors are formed in the elongated dual-stage cylindrical shape, a space in which the fine iron ores flow is sufficiently assured and the fine iron ores are prevented from being discharged as they are. Further, height of the cylindrical lower parts 10a, 20a and 30a is preferably formed in 1.0~1.5 times of height of the cylindrical upper parts 10b, 20b and 30b, and the inclination of the connecting parts 10c, 20c and 30c is preferably formed inclined by 20~30° with relation to the central axes of the respective fluidized bed reactors.

The fine iron ores which are preliminary reduced in the final reducing furnace 30 of the three-stage type fluidized bed reactors as above, are supplied to the upper part of the melter-gasifier 40 which will be described hereinafter via an ore discharging duct 31. The exhaust gas, which is discharged from the melter-gasifier 40, is, however, not directly supplied to the final reducing furnace 30 but via the dust separation device, which will be described hereinafter.

The dust separation device according to the present invention is mounted between the melter-gasifier 40 and the final reducing furnace 30 and includes two cyclones and three dust storage bins which are disposed in series.

Now, the dust separation device will be described in more detail.

First, a fourth cyclone 45, which is a first element of the dust separation device, is connected to the melter-gasifier 40, through an exhaust gas discharging duct 43 and a first dust supply duct 46. The fourth cyclone 45 is supplied with high temperature exhaust gas from the melter-gasifier 40 via the exhaust gas discharging duct 43 and primarily separate dusts which are included in the exhaust gas to collect. The dusts collected by the fourth cyclone 45 are supplied to the melter-gasifier 40 via the first dust supply duct 46. Reducing gas from which the dusts are primarily removed in the fourth cyclone 45 is supplied to a fifth cyclone 50 which will be described hereinafter via an exhaust gas discharging duct 47 which is mounted at an upper part of the fourth cyclone 45.

The fifth cyclone 50 separates and collects dusts of an ultra fine particle shape which are included in the reducing gas which is supplied from the fourth cyclone 45 but not separated by the fourth cyclone 45. The ultra fine dusts collected by the fifth cyclone 50 are supplied to a first dust storage bin 60 via a second dust supply duct 51 which is connected to a lower part of the fifth cyclone 50, wherein the second dust supply duct 51 is mounted with a two-way valve 52 so that the dusts collected in the fifth cyclone 50 are partially re-supplied to the melter-gasifier 40 via a third dust supply duct 57 as necessary. The third dust supply duct 57 may be directly connected to the melter-gasifier 40 and is more preferably connected to the first dust supply duct 46.

The fifth cyclone 50 is connected to a reducing gas discharge duct 58 at an upper part to supply the reducing gas from which the dusts are removed to the final reducing furnace 30.

The first dust storage bin 60 is mounted with a first nitrogen injection device N1 at a lower part for conveying the stored ultra fine dusts to a second dust storage bin 70. The first dust storage bin 60 is connected to the dust storage bin 70 via a dust conveying duct 61.

The second dust storage bin 70 is connected to a third dust storage bin 80 via a fourth dust supply duct 71, so that the ultra fine dusts collected in the second dust storage bin 70 are supplied to the third dust storage bin 80 via the fourth dust supply duct 71.

A lower part of the third dust storage bin 80 is connected to an upper part of a gas distributor 32 of the final reducing furnace 30 via a fifth dust supply duct 81. The fifth dust supply duct 81 is mounted with a dust charging feeder 82 at an upper part for controlling the amount of dusts which are supplied to the final reducing furnace 30. The dust charging feeder 82 is mounted with a second nitrogen-injection device N2 at a lower part for introducing the ultra fine dusts to the final reducing furnace 30 with high pressure. Accordingly, the ultra fine dusts which are injected into the upper part of the gas distributor 32 of the final reducing furnace 30 with the high pressure by the second nitrogen-injection device N2 are coated on surfaces of the fine iron ores in the final reducing furnace 30.

The dust separation device of the present invention as described above, is mounted with control valves 53, 63, 73, and 83 on the respective dust supply ducts for stopping the flow of the dusts and gas in case of operating or repairing the device if it is necessary.

Now the method for manufacturing the molten pig iron by melting the fine iron ores of a wide particle size distribution by using the smelting reduction apparatus of the present invention will be described in more detail.

First, the fine iron ores fallen down from a charging bin 5 are supplied to a side of the pre-heating furnace 10 via an ore charging duct 1, the iron ores of fine particles which are collected in the first cyclone 15 are supplied to a side of the pre-heating furnace 10 via a first circulation duct 17, and the high temperature reducing gas which is discharged from the pre-reducing furnace 20 is supplied to a lower part of the pre-heating furnace 10 via the gas supply duct 28. The fine iron ores and the iron ores of fine particles, which are supplied to the pre-heating furnace 10, are preheated by the reducing gas in the pre-heating furnace 10, forming a bubbling fluidized bed.

The pre-reducing furnace 20 is supplied with the fine iron ores preheated by the pre-heating furnace 10 via an ore charging duct 11 to a side, as well as the iron ores of fine particles, which are collected in the second cyclone 25, via a second circulation duct 27 to a side. Further the pre-reducing furnace 20 is supplied with the high temperature reducing gas discharged from the final reducing furnace 30 to its lower part via a gas supply duct 38. The fine iron ores and the iron ores of fine particles, which are supplied to the pre-reducing furnace 20, are pre-reduced by the reducing gas in the pre-reducing furnace 20, forming a bubbling fluidized bed.

The final reducing furnace 30 is supplied with the fine iron ores pre-reduced by the pre-reducing furnace 20 via an ore charging duct 21 to a side, as well as the iron ores of fine particles, which are collected in the third cyclone 35, via a third circulation duct 37 to a side. Further the final reducing furnace 30 is supplied with the high temperature reducing gas discharged from the fourth cyclone 50 to its lower part via a gas supply duct 58. The fine iron ores and the iron ores of fine particles which are supplied to the final reducing furnace 30 are finally preliminary reduced by the reducing gas in the final reducing furnace 30, forming a bubbling fluidized bed.

As above, fine particle sponge iron, which is sequentially preliminary reduced while passing through the three-stage type fluidized bed reactor, are charged into the upper part of the melter-gasifier 40 via the ore discharge duct 31. The melter-gasifier 40 is supplied with coal and high pressure oxygen in addition to the sponge iron which is supplied from the final reducing reactor 40 so as to finally reduce the sponge iron and melt, thereby producing the molten pig iron.

The melter-gasifier 40 generates a lot of exhaust gas of high temperature in the process of melting the sponge iron.

The exhaust gas contains ultra fine dusts which contains a lot of carbon and carbonized gas generated in the process of the burning of the charged coal. The dusts contained carbon and carbonized gas are sequentially separated by the dust separation device of the present invention. Now, the process for separating the exhaust gas will be described in more detail.

The exhaust gas, which is discharged from the melter-gasifier 40, is supplied to the fourth cyclone 45 via the discharge duct 43. The exhaust gas supplied to the cyclone is separated into dusts in the particle state and carbonized gas in the gas state by a strong centrifugal force, wherein the separated dusts are fallen down to a lower part in the cyclone and the carbonized gas is gathered to an upper part in the cyclone. The separated dusts collected to the lower part are re-supplied to the melter-gasifier 40 via the first dust supply duct 46, while the separated carbonized gas is discharged to the fifth cyclone 50, containing the ultra fine dusts which are not separated.

The fifth cyclone 50 secondarily collects the ultra fine dusts included in the supplied carbonized gas The carbonized gas from which the ultra fine dusts are separated is supplied to the final reducing furnace 30 to be used as the reducing gas. The ultra fine dusts collected in fifth cyclone 50 are supplied to the melter-gasifier 40 or the first dust storage bin 60.

The dusts discharged to the first dust storage bin 60 are conveyed to the second dust storage bin 70 by the first nitrogen injection device N1 and continuously supplied to the third dust storage bin 80.

The dusts stored in the third dust storage bin 80 are injected to the upper part of the gas distributor 32 of the final reducing furnace 30 by the second is nitrogen injection device N2 and coat the fine iron ore particles which are in bubbling fluidization state in the final reducing furnace 30.

At this time, the pressure of the nitrogen supplied by the first and second nitrogen injection devices N1 and N2 is higher than the pressure in the furnace by 2~3 times. The dusts are smoothly conveyed and stabled injected in the final reducing furnace 30 by the high pressure of the nitrogen.

An amount of the dusts which are introduced into the final reducing furnace 30 is preferably controlled to be 0.5~1.0 wt % with relation to an amount of raw iron ores which are charged into the pre-heating furnace 10. If the amount of the dusts which are introduced into the final reducing furnace 30 is less than 0.5 wt %, sticking prevention effect between the fine iron ores becomes reduced, while if the amount exceeds 1.0 wt %, the gas distributor may be clogged by the ultra fine dusts in next process.

It is preferable to control a velocity of the reducing gas in the pre-heating furnace 10, the pre-reducing furnace 20 and the final reducing furnace 30 in the range of 1.2~1.5 time of a minimum fluidizing velocity of the fine iron ores which are staying in the furnaces. By maintaining the velocity of the reducing gas as above, the respective fluidized bed reactors may form a stable bubbling fluidized bed.

Now, preferred embodiments are suggested to help the apparent understanding of the present invention. The below embodiments are provided for the sake of clear understanding only and the present invention is not limited thereto.

Embodiment

The specification and experimental conditions for the smelting reduction apparatus of the preferred embodiment of the present invention is as follows.

1) Specification of the fluidized bed reactor (the pre-heating furnace, the pre-reducing furnace, and the final reducing furnace)

Radius of the lower cylindrical part: 0.3 m
  Radius of the upper cylindrical part: 0.6 m
  Height of the lower cylindrical part from the upper part of the gas distributor: 3 m
  Height of the upper cylindrical part from lower part of the inclination part: 3 m 2) Fine iron ores
  Particle size of the fine iron ores: under 10 mm
  Particle size distribution of the fine iron ores:
    under 0.125 mm: 15.5%, 0.1250 0.25 mm: 10.0%,
    0.25 0.5 mm: 9.1%, 0.51 0.0 mm 9.2%,
    1.0 3.0 mm: 22.2% 3.05.8 0.0 mm: 19.5%
    5.0 8.0 mm:13.7% 8.01 0.0 mm: 0.8%
  Chemical composition of the fine iron ores
    T. Fe: 63.49 wt %, FeO: 0.37 wt %, $SiO_2$: 4.32 wt %, $Al_2O_3$: 2.33 wt %, Mn: 0.05 wt %, S :0.007 wt %, P: 0.063%, crystal water: 5.41 wt %

3) Reducing gas
  Composition: CO: 65%, $H_2$: 25%, $CO_2$: 5%, $N_2$: 5%
  Temperature: 750–850
  Pressure: 2.0–3.0 barg 4) Chemical composition of the dusts
  T. Fe: 25–33 wt %, FeO: 10–15 wt %, $SiO_2$: 8–10 wt %, M. Fe: 10–15 wt %, $Al_2O_3$: 2–5 wt %, CaO: 2–5 wt %, MgO: 1–2%, C: 45–55 wt %, S: 1–5 wt %, Several experiments were carried out with the smelting reduction apparatus to examine the reduction of the fine iron ores.

The experimental results exhibited that reduced fine iron ores was begun to be discharged via the ore discharging duct 31 from the final reducing furnace 30 after 90 minutes from the beginning of the charging of the fine iron ores from the charging bin 5 into the pre-heating furnace 10.

An average reduction degree of the fine iron ores which are discharged from the final reducing furnace 30 was exhibited 86~90%, very excellent. An average gas utilization degree was 30–35%, and the gas consumption rate was 1350–1500 $Nm^3$/t-ore. Further, a difference of pressure between the upper part and the lower part of the gas distributor of the final reducing furnace 30 was maintained in the range of 20–30 mbar, which was not increased even after a long time. As above, the small difference of pressure between the upper and lower parts of the gas distributor means that the clogging phenomenon of the gas distributor nozzle did not occur. Finally, the particle size distribution of the reduced iron which is preliminary reduced and discharged finally was exhibited uniform, which means that the sticking phenomenon between the fine iron ores did not occur in the respective fluidized bed reactors.

As shown from the result of the above embodiment, the smelting reduction apparatus according to the present invention may effectively prevent the clogging phenomenon of the gas distributor nozzle due to the dusts which is apt to occur in the related art fludized bed reactors.

Further, the sticking phenomenon between the reduced iron particles which may occur in the process of the reduction of the fine iron ores may be prevented by supplying the dusts containing a lot of carbon into the fluidizing bed reactors to coat the surfaces of the reduced iron.

While the present invention has been described in detail with reference to the preferred embodiment, those skilled in the art will appreciate that various modifications and substitutions can be made thereto without departing from the spirit and scope of the present invention as set forth in the appended claims.

What is claimed is:

1. A smelting reduction apparatus for preventing sticking of charged fine iron ores in fluidized bed reactors, comprising:
    a three-stage type fluidized bed reactors including;
        a) an ore charging duct mounted on a side of respective fluidized bed reactors for charging fine iron ores,
        b) a gas supply duct mounted at a lower part of the respective fluidized bed reactors for supplying reducing gas,
        c) an ore discharge duct mounted on a side wall of the respective fluidized bed reactors for discharging fine iron ores which are charged into the respective fluidized bed reactors and reactions thereof are finished,
        d) a gas distributor mounted in the respective fluidized bed reactors for uniformly distributing the reducing gas to the inner space of the respective fluidized bed reactors, and
        e) a cyclone for separating fine iron ore particles from the exhausted gas, which is discharged from the upper parts of the respective fluidized bed reactors, to supply the reducing gas to next reactor or release outside and recycle the fine iron ore particles to the lower parts of the respective fluidized bed reactors;
    a melter-gasifier for manufacturing molten pig iron by finally reducing the fine iron ores of which reaction is finished in a final fluidized reactor; and
    a dust separating device, which performs separation of exhausted gas from the melter-gasifier into dusts and reducing gas, so as to supply the separated reducing gas to a lower part of the final fluidized bed reactor, dusts having a larger particle sizes in the separated dusts to the melter-gasifier again, and fine dusts having a smaller particle sizes in the separated dusts to an upper part of a gas distributor of the final fluidized bed reactor.

2. A smelting reduction apparatus of claim 1, wherein each of the fluidized bed reactors of the three-stage type fluidized bed reactor is manufactured in a dual-stage cylindrical shape, in which a diameter of a lower part is small and a diameter of an upper part is large so that lower and the upper parts are connected to each other slantingly.

3. A smelting reduction apparatus of claim 2, wherein the diameter of the upper cylindrical part is larger than that of the lower cylindrical part by 1.5~2.0 times.

4. A smelting reduction apparatus of claim 3, wherein a height of the cylindrical lower parts is higher by 1.0~1.5 times than that of the cylindrical upper parts.

5. A smelting reduction apparatus of claim 4, wherein the inclination of the connection between the upper and lower cylindrical parts is 20~30° with relation to a central axis of the fluidized bed reactors.

6. A smelting reduction apparatus of claim 5, wherein a whole height of the fluidized bed reactors is larger than a diameter of the lower cylindrical part by 10~20 times.

7. A smelting reduction apparatus of claim 1 or claim 2, wherein the dust separation device includes at least two or more cyclones and at least one or more dust storage bins, wherein a first cyclone of the cyclones is connected to the upper part and the lower part of the melter-gasifier and an upper part of a second cyclone, the second cyclone is connected to the lower part of the final fluidized bed reactor and an upper part of the dust storage bin, and the dust storage bin is connected to an upper part of the gas distributor of the final fluidized bed reactor.

8. A smelting reduction apparatus of claim 7, wherein the second cyclone and the dust storage bin is connected by a dust supply duct which is mounted with a two-way valve, wherein the dust supply duct branched by the two-way valve is connected to a dust supply duct which connects the first cyclone and the melter-gasifier.

9. A smelting reduction apparatus of claim 8, wherein the dust storage bin part includes three dust storage bins respectively connected to one another via the dust supply ducts.

10. A smelting reduction apparatus of claim 9, wherein a dust supply duct which is positioned at a lower part of a first dust storage bin is mounted with a nitrogen gas injection device, so that dusts stored in the first dust storage bin may be conveyed to a second dust storage bin with high pressure.

11. A smelting reduction apparatus of claim 10, wherein a dust supply duct which is positioned at a lower part of a third dust storage bin is mounted with a nitrogen gas injection device, so that the dusts stored in the third dust storage bin may be injected into the final reactor with high pressure.

12. A smelting reduction apparatus of claim 11, wherein a dust supply duct connecting the lower part of the third dust storage bin to the nitrogen gas injection device is mounted with a dust introducing feeder for controlling an amount of dust supply to the final reactor.

13. In a smelting reduction process in which fine iron ores are charged into a three-stage type fludizing bed reactor and supplied with reducing gas for manufacturing sponge iron by reducing the charged fine iron ores, and molten pig iron is manufactured by charging the sponge iron into a melter-gasifier, a process for manufacturing molten pig iron by using the smelting reduction process characterized in that exhaust gas discharged from the melter-gasifier is separated into reducing gas and dusts, the separated reducing gas is supplied to a lower part of a final fluidized bed reactor, and fine dusts having a smaller particle sizes in the separated dusts are supplied to an upper part of a gas distributor of the final fluidized bed reactor for coating fine iron ores which are in bubbling fluidization state in the respective fluidizing bed reactors so as to prevent sticking of the fine iron ores to each other and to the gas distributor.

14. A process for manufacturing molten pig iron of claim 13, wherein the fine dusts having a smaller particle sizes are supplied to the final fluidized bed reactor by high pressure nitrogen.

15. A process for manufacturing molten pig iron of claim 14, wherein the pressure of the nitrogen for conveying the dust particles is higher than an internal pressure of the final fluidizing bed reactor by 2~3 times.

16. A process for manufacturing molten pig iron of claim 15, wherein
    an amount of the dusts which are injected into the final reducing furnace is to be 0.5~1.0 wt % with relation to an amount of raw iron ores which are initially charged into the fluidizing bed reactors.

17. A process for manufacturing molten pig iron of claim 16, wherein a velocity of the reducing gas in the fluidizing bed reactors is to be 1.2~1.5 times of a minimum fluidizing velocity of the fine iron ores which are staying in the fludizing bed reactors.

* * * * *